United States Patent
Quast et al.

(10) Patent No.: US 10,838,429 B2
(45) Date of Patent: Nov. 17, 2020

(54) METHOD AND SYSTEM FOR LOCATING A VEHICLE LOCATED WITHIN A PARKING AREA

(71) Applicant: Robert Bosch GmbH, Stuttgart (DE)

(72) Inventors: Gerrit Quast, Nuertingen (DE); Stefan Nordbruch, Kornwestheim (DE)

(73) Assignee: Robert Bosch GmbH, Stuttgart (DE)

( * ) Notice: Subject to any disclaimer, the term of this patent is extended or adjusted under 35 U.S.C. 154(b) by 417 days.

(21) Appl. No.: 15/747,797

(22) PCT Filed: Jun. 16, 2016

(86) PCT No.: PCT/EP2016/063872
§ 371 (c)(1),
(2) Date: Jan. 26, 2018

(87) PCT Pub. No.: WO2017/021049
PCT Pub. Date: Feb. 9, 2017

(65) Prior Publication Data
US 2018/0224865 A1    Aug. 9, 2018

(30) Foreign Application Priority Data
Aug. 4, 2015 (DE) .................. 10 2015 214 826

(51) Int. Cl.
*G05D 1/02* (2020.01)
*H04W 4/029* (2018.01)
(Continued)

(52) U.S. Cl.
CPC .......... *G05D 1/0282* (2013.01); *B60W 30/06* (2013.01); *G01S 5/0263* (2013.01); *G01S 5/08* (2013.01);
(Continued)

(58) Field of Classification Search
CPC ........ G05D 1/0282; G05D 2201/0213; H04W 4/029; H04W 84/12; B60W 30/06;
(Continued)

(56) References Cited

U.S. PATENT DOCUMENTS

2002/0196161 A1   12/2002  Gould et al.
2005/0105600 A1    5/2005  Culum et al.
(Continued)

FOREIGN PATENT DOCUMENTS

CN          102573055 A        7/2012
DE       102007051961      *  5/2009
(Continued)

OTHER PUBLICATIONS

International Search Report dated Sep. 16, 2016, of the corresponding International Application PCT/EP2016/063872 filed Jun. 16, 2016.
(Continued)

*Primary Examiner* — Gertrude Arthur Jeanglaude
(74) *Attorney, Agent, or Firm* — Norton Rose Fulbright US LLP; Gerard Messina

(57) ABSTRACT

A method for locating a vehicle situated within a parking area using a plurality of WLAN base stations each including an antenna array, the vehicle including a communication interface for communication with the WLAN base stations via a wireless WLAN communication network. The method includes receiving, via the respective antenna array, a radio signal sent by the communication interface of the vehicle via the wireless communication network; ascertaining a respective angle of incidence of the respective received radio signal relative to a respective normal of the antenna array; ascertaining a signal intensity of the respective received radio signal; and carrying out a triangulation using the ascertained angles of incidence and the ascertained signal
(Continued)

intensities in order to locate the vehicle within the parking area. A corresponding system, a parking area, and a computer program are also described.

9 Claims, 2 Drawing Sheets

(51) Int. Cl.
  *G08G 1/01* (2006.01)
  *G08G 1/00* (2006.01)
  *G08G 1/017* (2006.01)
  *G01S 5/08* (2006.01)
  *G01S 5/02* (2010.01)
  *B60W 30/06* (2006.01)
  *H04W 84/12* (2009.01)

(52) U.S. Cl.
  CPC ........... *G08G 1/017* (2013.01); *G08G 1/0112* (2013.01); *G08G 1/0116* (2013.01); *G08G 1/20* (2013.01); *G08G 1/207* (2013.01); *H04W 4/029* (2018.02); *B60W 2556/50* (2020.02); *G05D 2201/0213* (2013.01); *H04W 84/12* (2013.01)

(58) Field of Classification Search
  CPC .... B60W 2556/50; G01S 5/0263; G01S 5/08; G08G 1/0112; G08G 1/0116; G08G 1/017; G08G 1/20; G08G 1/207

USPC .......................................................... 701/26
  See application file for complete search history.

(56) References Cited

U.S. PATENT DOCUMENTS

| 2007/0132577 | A1 | 6/2007 | Kolavennu |
| 2007/0178911 | A1 | 8/2007 | Baumeister et al. |
| 2008/0204322 | A1 | 8/2008 | Oswald et al. |
| 2011/0117272 | A1 | 5/2011 | Nielsen et al. |
| 2012/0064865 | A1* | 3/2012 | Choi ..................... H04W 4/029 |
| | | | 455/414.1 |
| 2017/0021768 | A1* | 1/2017 | Jaegal ................... B60Q 1/525 |

FOREIGN PATENT DOCUMENTS

| DE | 102007051961 A1 | 5/2009 |
| DE | 102012222562 A1 | 6/2014 |

OTHER PUBLICATIONS

Chou, Li-der, Sheu, Chun-Cheng, Chen, home-Way. Design and prototype implementation of a novel automatic vehicle parking system. In: Hybrid Information Technology, 2006. ICHIT'06. International Conference on. IEEE, 2006. S. 292-297.

* cited by examiner

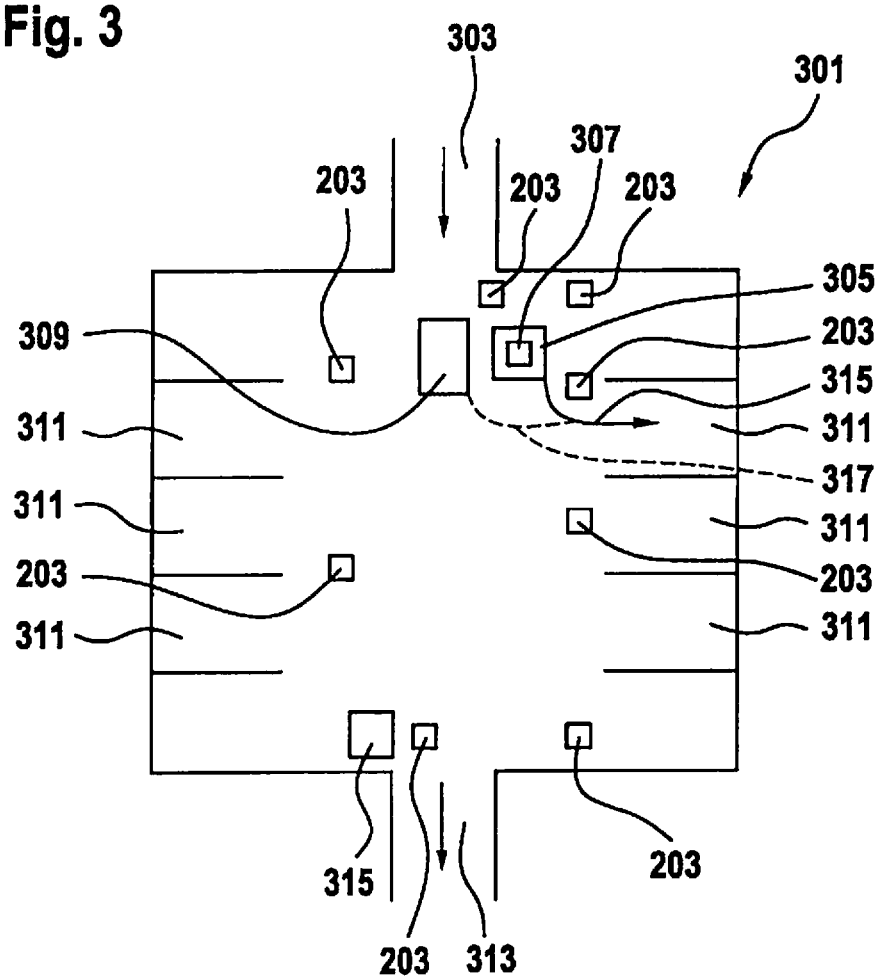

METHOD AND SYSTEM FOR LOCATING A VEHICLE LOCATED WITHIN A PARKING AREA

FIELD

The present invention relates to a method and to a system for locating a vehicle situated within a parking area, using a plurality of WLAN base stations, each including an antenna array. The present invention also relates to a parking area for vehicles, and to a computer program.

BACKGROUND INFORMATION

German Patent Application No. DE 10 2012 222 562 A1 describes a system for commercial parking areas, for guiding a vehicle from a start position to a destination position.

In a fully automatic (autonomous) so-called valet parking, a vehicle is parked by its driver at a drop zone, for example in front of a car park, and from there the vehicle drives itself to a parking position/parking bay, and back to the drop zone.

For so-called valet parking, it is important that the vehicle can be located as precisely as possible within the car park, or in general the parking area.

SUMMARY

An object of the present invention is to provide an efficient design by which a vehicle situated within a parking area can be efficiently located.

Advantageous example embodiments of the present invention are described herein.

According to an aspect of the present invention, a method is provided for locating a vehicle situated within a parking area, using a plurality of WLAN base stations each including an antenna array, the vehicle including a communication interface for communication with the WLAN base stations via a wireless WLAN communication network, the method including the following steps:

receiving, via the respective antenna array, a radio signal sent by the communication interface of the vehicle via the wireless communication network,
  ascertaining a respective angle of incidence of the respective received radio signal relative to a respective normal of the antenna array,
  ascertaining a signal intensity of the respective received radio signal,
  carrying out a triangulation using the ascertained angles of incidence and the ascertained signal intensities in order to locate the vehicle within the parking area.

According to another aspect of the present invention, a system is provided for locating a vehicle situated within a parking area, the vehicle including a communication interface for communication with WLAN base stations via a wireless WLAN communication network, including:

a plurality of WLAN base stations, each including an antenna array, for receiving, via the respective antenna array, a radio signal sent by the communication interface of the vehicle via the wireless WLAN communication network,
  an ascertaining device for ascertaining an angle of incidence of the respective received radio signal relative to a respective normal of the antenna array and for ascertaining a signal intensity of the respective received radio signal, and
  a locating device for carrying out a triangulation using the ascertained angles of incidence and the ascertained signal intensities in order to locate the vehicle within the parking area.

According to a further aspect of the present invention, a parking area for vehicles is provided including the system for locating a vehicle situated within a parking area.

According to another aspect of the present invention, a computer program is provided that includes program code for carrying out the method for locating a vehicle situated within a parking area when the computer program is executed on a computer.

The present invention thus includes, in particular and inter alia, locating the vehicle within the parking area based on two location methods or location techniques. The first of these is the so-called "angle of arrival" location technique. The term "angle of arrival" designates the angle of incidence of the radio signal relative to the normal of the antenna array. That is, relative to the base station a direction is ascertained from which the radio signal was sent, thus in the present case from the vehicle.

Secondly, the so-called "received signal strength" location technique is used. "Received signal strength" designates the received signal intensity. On the basis of this, in particular an estimation can be made of a distance between the base station and the vehicle. This is because as the distance between the vehicle and the base station increases an attenuation of the radio signal increases, resulting in a lower signal strength. An attenuation as is typically present within the parking area can for example be ascertained beforehand using measurement technology. For example, radio signals can be sent to the base station from known distances with known transmit power. Thus, the sent transmit power and the received signal strength are known. From this, an attenuation can then be ascertained. As a result, the attenuation is known. It is then possible, when the transmit power is not known, at least to estimate how far the vehicle is from the WLAN base station. In a specific embodiment, the transmit power of the radio signal is sent along by the vehicle via its communication interface. For example, it is provided that the radio signal includes the information about the transmit power. That is, for example the transmit power of the sent-out radio signal is correspondingly received.

According to another specific embodiment, the estimation or ascertaining of the distance between the vehicle and the WLAN base station includes the feature that a signal power level is ascertained based on the measured signal intensity. Because this is the received signal, in a specific embodiment a receive power is determined or ascertained.

Each of these methods or techniques may indeed in itself have a certain degree of imprecision. However, through the use of both location techniques, the precision of location can advantageously be efficiently increased. For example, the vehicle positions determined by each of the two location techniques can be plausibilized and/or compensated relative to one another.

The present invention is thus includes using two location techniques, the angle of arrival location technique and the received signal strength location technique, in order to enable location of the vehicle within the parking area.

WLAN stands for Wireless Local Area Network. In the sense of the present invention, a WLAN communication network is a communication network according to the IEEE-802.11 standard, in particular including expansions thereof, for example 802.11a.

In the sense of the present invention, an antenna array includes a plurality of antennas that are each fashioned to receive and/or to send out radio signals.

In the sense of the present invention, radio signals are WLAN radio signals.

Through the use of the two location techniques, the vehicle can efficiently be located within the parking area. That is, based on the triangulation, the vehicle can be located within the parking area.

According to a specific embodiment, the location includes the feature that the vehicle is located within a digital map of the parking area, the digital map indicating a respective position of the WLAN base stations within the parking area. Thus, the positions of the WLAN base stations within the parking area are known. If a position of the vehicle relative to the WLAN base stations is then ascertained, in this way a position of the vehicle within the parking area is ascertained.

In the sense of the present invention, a parking area is a surface for parking vehicles. The parking area thus forms in particular a contiguous surface that has a plurality of parking spaces (in the case of a parking area on private ground) or parking stalls (in the case of a parking area on public ground).

The parking stalls or parking spaces are thus parking positions at which vehicles can park. According to a specific embodiment, the parking area is realized as a car park. According to another specific embodiment the parking area is realized as a garage, also called a parking garage. According to another specific embodiment, the parking area includes roofed or non-roofed parking surfaces or parking positions.

According to a specific embodiment, the vehicle is a motor vehicle, for example a passenger vehicle or a truck. For example, the motor vehicle is a two-wheeled motor vehicle, such as a motorcycle.

According to a specific embodiment, it is provided that the system for locating a vehicle situated within a parking area is fashioned or set up to carry out the method for locating a vehicle situated within a parking area.

Technical functionalities relating to the system result analogously from corresponding technical functionalities of the method, and vice versa. That is, statements made in connection with the system hold analogously for the method, and vice versa.

According to a specific embodiment, it is provided that based on the location of the vehicle it is checked whether an actual position of the vehicle corresponds to a specified target position within the parking area.

In this way, in particular the technical advantage can be brought about that it can be efficiently checked whether the vehicle is situated at a specified target position within the parking area.

In another specific embodiment, it is provided that, based on the location of the vehicle, it is checked whether an actual position of the vehicle corresponds to a specified target position within the parking area, and if the actual position is different from the target position, an ascertained route leading from the target position to a destination position situated within the parking area is adapted to the actual position of the vehicle, so that the vehicle is guided in driverless fashion from the actual position to the destination position based on the adapted route.

In this way, in particular the technical advantage is brought about that it can be efficiently checked whether an adaptation of the ascertained route is necessary or not. This is because an ascertained route that is valid for guiding the vehicle from the target position to the destination position is as a rule no longer valid for guiding the vehicle from the actual position to the destination position. This is because the ascertained route is based on the assumption that the vehicle is situated at the target position. Thus, if no adaptation were to be carried out, the vehicle could for example collide with obstacles. Thus, due to the fact that the ascertained route is adapted to the actual position, the vehicle can be guided efficiently in driverless fashion from the actual position to the destination position. In particular, in this way the technical advantage is brought about that collisions of the vehicle with objects within the parking area can be prevented.

If the check has yielded the result that the actual position matches the target position, no adaptation is provided.

The driverless guiding of the vehicle includes in particular the case in which the vehicle is guided by remote control. A remote controlling of the vehicle includes in particular the feature that remote controlling commands are sent to the vehicle. This is done for example via the WLAN communication network and/or via a mobile radiotelephone network.

The driverless guiding of the vehicle from the actual position to the destination position includes in particular the case in which the vehicle drives autonomously, i.e., by itself, to the destination position. That is, for example the adapted route and the destination position are communicated to the vehicle, so that based thereon the vehicle drives by itself, i.e. autonomously, to the destination position. In particular, it is provided that a digital map of the parking area is provided to the vehicle, so that the vehicle drives, and/or can drive, autonomously to the destination position based on the digital map.

In the sense of the present invention, "autonomous" means in particular that the vehicle navigates or drives or is guided in the parking area by itself, i.e., without intervention by a driver. The vehicle thus drives by itself on the parking area without a driver having to control the vehicle for this purpose.

Guiding includes in particular transverse and/or longitudinal guiding of the vehicle. Such an autonomous driving vehicle, which can automatically enter and leave parking spaces, is for example referred to as an AVP vehicle. AVP stands for "automated valet parking." Vehicles that do not have this AVP functionality are referred to for example as normal vehicles.

According to a specific embodiment, it is provided that the target position is a drop position within the parking area at which a vehicle is to be dropped off so that an automatic parking process can be carried out.

In this way, in particular the technical advantage is brought about that it can be efficiently ensured that the carrying out of the automatic parking process is correctly begun. In particular, in this way the technical advantage can be brought about that an automatic parking process can be efficiently carried out.

An automatic parking process includes the feature that the vehicle is guided in driverless fashion from the drop position to a parking position. The automatic parking process includes the feature that the vehicle is guided from the parking position to a retrieval position in driverless fashion. The retrieval position for example is the same as the drop position.

A drop position designates a position within the parking area at which a vehicle is to be dropped off by a driver in order to carry out an automatic parking process. The retrieval position designates a position within the parking area at which a driver is to retrieve the vehicle after the automatic parking process has been carried out. According to a specific embodiment, a drop position includes a plurality of parking spaces.

According to a specific embodiment, it is provided that some of the plurality of WLAN base stations are situated within the parking area in such a way that a common radio signal receive region, formed from the respective radio signal receive regions of the WLAN base stations, includes the target position and a specified region of from 5 m to 10 m around the target position.

The target position for example matches the drop position. In this way, in particular the technical advantage is brought about that the target position can be efficiently monitored.

According to a further specific embodiment, it is provided that some of the plurality of WLAN base stations are situated within the parking area in such a way that a common radio signal receive region formed from the respective radio signal receive regions of the WLAN base stations includes all driving paths provided for vehicles.

In this way, in particular the technical advantage is brought about that the driving paths provided for vehicles can be efficiently monitored. That is, vehicles situated on these driving paths can be efficiently located.

According to a specific embodiment, it is provided that at least some, for example all, WLAN base stations are fashioned as WLAN routers.

According to a specific embodiment, it is provided that the vehicle is identified by an individual feature of the radio signal. As a rule, radio signals have individual features that distinguish them from other radio signals. These individual features result for example from different radio transmitters. For example, the radio signals differ in their rise time. The term "RF fingerprinting" is used for this type of identification.

In this way, for example the technical advantage is brought about that a received radio signal can be unambiguously assigned to a particular vehicle. This simplifies a location of the vehicle, in particular when a multiplicity of vehicles have to be located simultaneously. Thus, the vehicle can be unambiguously identified within a multiplicity of vehicles.

Below, the present invention is explained in more detail on the basis of preferred exemplary embodiments.

BRIEF DESCRIPTION OF THE DRAWINGS

FIG. 3 shows a parking area.

DETAILED DESCRIPTION OF EXAMPLE EMBODIMENTS

Figure 1:
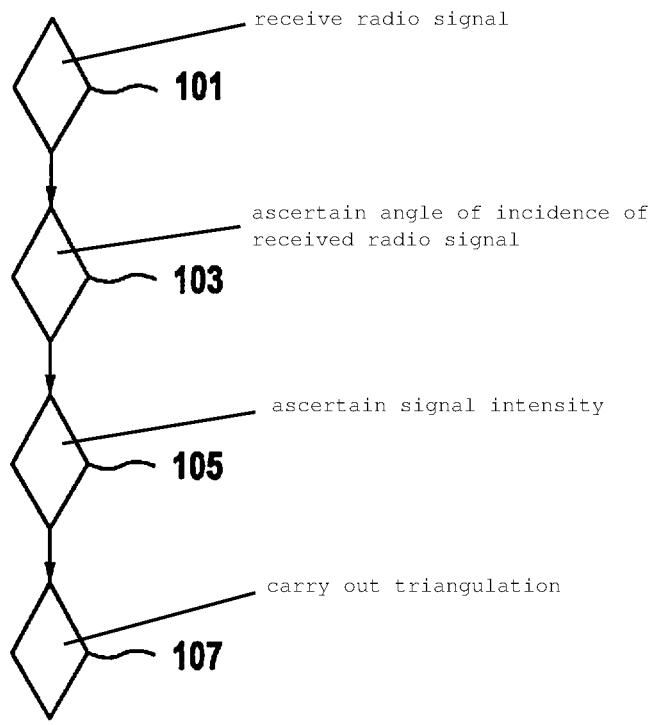
FIG. 1 shows a flow diagram of a method for locating a vehicle situated within a parking area.

FIG. 1 shows a flow diagram of a method for locating a vehicle situated within a parking area using a plurality of WLAN base stations each including an antenna array, the vehicle including a communication interface for communication with the WLAN base stations via a wireless WLAN communication network.

The method includes the following steps:
receiving 101, via the respective antenna array, a radio signal sent by the communication interface of the vehicle via the wireless communication network,
ascertaining 103 a respective angle of incidence of the respective received radio signal relative to a respective normal of the antenna array,
ascertaining 105 a signal intensity of the respective received radio signal,
carrying out 107 a triangulation using the ascertained angles of incidence and the ascertained signal intensities in order to locate the vehicle within the parking area.

Based on the triangulation, the vehicle is located within the parking area.

Figure 2:
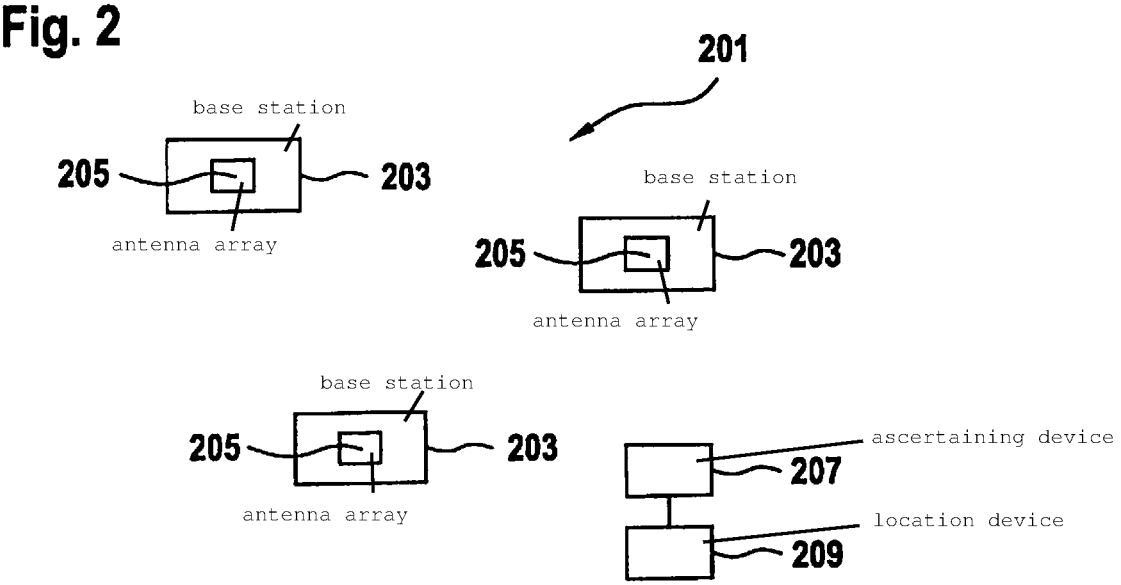
FIG. 2 shows a system for locating a vehicle situated within a parking area.

FIG. 2 shows a system 201 for locating a vehicle situated within a parking area, the vehicle including a communication interface for communication with WLAN base stations via a wireless WLAN communication network.

System 201 includes a plurality of WLAN base stations 203. Each of these WLAN base stations 203 includes an antenna array 205 for receiving a radio signal sent by the communication interface of the vehicle via the wireless WLAN communication network.

The system 201 includes an ascertaining device 207 for ascertaining an angle of incidence of the respective received radio signal relative to a respective normal of antenna array 205, and for ascertaining a signal intensity of the respective received radio signal. The ascertaining device is for example integrated in one of the WLAN base stations 203. For example, it is provided that each of the plurality of WLAN base stations includes its own ascertaining device 207.

System 201 includes a location device 209 for carrying out a triangulation using the ascertained angles of incidence and the ascertained signal intensities in order to locate the vehicle within the parking area.

For example, it is provided that location device 209 is integrated in one of the WLAN base stations 203. In particular, it is provided that the plurality of WLAN base stations 203 each includes its own location device 209. In this case, it is provided in particular that the respective ascertained angles of incidence and the respective ascertained signal intensities are provided to each of the WLAN base stations 203, so that each WLAN base station 203 itself locates and/or can locate the vehicle within the parking area.

Antenna array 205 is in particular fashioned to send WLAN radio signals to the communication interface of the vehicle via the WLAN communication network. Thus, a WLAN communication channel is formed between the vehicle and each of the WLAN base stations.

In the sense of the present invention, an antenna array includes in particular a plurality of antennas.

FIG. 3 shows a parking area 301 for vehicles.

Parking area 301 includes an entrance 303 and an exit 313 situated opposite entrance 303. Within parking area 301, and situated after entrance 303 in the direction of entry, there is provided a drop position 305 at which vehicles are to be dropped off so that an automatic parking process can be carried out within parking area 301. Parking area 301 includes a plurality of parking positions 311.

In a specific embodiment, drop position 305 includes a plurality of parking spaces.

A vehicle 307 has already been dropped off at drop position 305. However, at the moment this vehicle 307 is not supposed to carry out an automatic parking process. The fact that vehicle 307 was nonetheless dropped off at drop position 305 can for example be due to the fact that the driver of vehicle 307 was too lazy to park vehicle 307 at one of the parking positions 311 of parking area 301. Thus, for reasons of convenience, the driver parked vehicle 307 at drop position 305.

Vehicle 309, in contrast, is provided for the carrying out of an automatic parking process. Normally, the driver of vehicle 309 would then have to drop off the vehicle at drop position 305 so that the automatic parking process can be carried out and/or started from this position.

However, in this case drop position 305 is blocked by vehicle 307. Thus, the driver of the vehicle 309 has no other choice than to drop his vehicle off next to drop position 305.

Normally, a parking area management system for operating parking area 301 works from the assumption that, for the carrying out of the automatic parking process, a vehicle has been dropped off at drop position 305. Such a parking area management system then calculates a route for carrying out the automatic parking process to one of the parking positions 311, beginning from drop position 305. Here, this route is identified as an example by an arrow having reference character 315.

If this route 315 were now to be used without adaptation in order to guide vehicle 309—which has not been dropped off at drop position 305 in the intended manner—in driverless fashion to parking position 311 provided for vehicle 309, then vehicle 309 would not reach its assigned parking position 311. It is therefore important that before the beginning of an automatic parking process it is ascertained where vehicle 309 is situated within the parking area.

In order to enable efficient location of vehicle 309, in particular to be able to determine or check whether vehicle 309 has been dropped off at drop position 305 as target position, system 201 as shown in FIG. 2 is provided, which system is included in parking area 301 in this specific embodiment. For clarity, WLAN base stations 203 are shown here in a simplified representation without their antenna array 205.

The plurality of WLAN base stations 203 are situated within parking area 301. In particular, preferably a plurality of the WLAN base stations are situated around drop position 305, so that the plurality of WLAN base stations 203 can efficiently monitor this region.

Based on system 201, it can thus be ascertained whether vehicle 309 is situated at drop position 305 or not. In particular, the actual position of vehicle 309 within parking area 301 is thus ascertained. It is then checked whether this actual position matches the target position, i.e. drop position 305.

In the present situation this is not the case, so that an adapted route to parking position 311 has to be ascertained. This adapted route is shown in dashed lines and is designated with reference character 317. As is shown in FIG. 3, this adapted route 317 then merges with ascertained route 315, so that only the part of adapted route 317 that differs from the originally ascertained route 315 is shown in dashed lines.

In the context of the automatic parking process, based on the adapted route 317 the vehicle is thus guided in driverless fashion from its actual position to parking position 311. The vehicle is parked there. This also takes place in driverless fashion.

After a predetermined parking duration has expired, or for example after a request by the driver, vehicle 309 is then guided in driverless fashion from this parking position 311 to a retrieval position 315 at which the driver can retrieve the vehicle. This retrieval position 315 is situated immediately before exit 313, in the direction of exiting.

In a specific embodiment that is not shown, it is provided that the AVP process is not started if it is determined that vehicle 309 is not standing at or dropped off at drop position 305.

In a specific embodiment that is not shown, it is provided that after the parking, vehicle 309 is guided in driverless fashion back to drop position 305. In this case, drop position 305 is then the same as a retrieval position.

As FIG. 3 shows, the plurality of WLAN base stations 203 are situated within parking area 301 in such a way that these stations can acquire, via sensors, all driving paths provided for vehicles, in order to efficiently be able to locate the vehicles moving within the parking area.

The present invention thus includes, in particular and inter alia, the idea of providing a technical design based on which a location of a vehicle can be efficiently improved in the context of an automatic parking process. The basic idea of the present invention is in particular the use of two location techniques: the angle of arrival location technique and the received signal strength location technique. Through the use of two location techniques, a lack of precision of each of the individual location techniques can advantageously be compensated, and thus improved overall.

According to a specific embodiment, it is provided that the design is used in particular for a so-called first detection, including a determination of position, at the drop position, or in a region around the drop position, in particular before a start or beginning of the automatic parking process.

Thus, according to a specific embodiment it is provided that on or within the parking area, for example in the car park, a plurality of WLAN base stations can be used that are situated in particular along the driving paths provided for the vehicles.

According to a specific embodiment, it is provided that in the first detection it is checked whether the vehicle provided for an automatic parking process, and which for example may have registered in advance for such an automatic parking process, is actually situated at the drop position. The drop position can also be designated a drop zone. Preferably, a plurality of the WLAN base stations are situated around the drop zone in order to enable efficient location of vehicles within a drop zone region.

The design according to the present invention is used in particular to support already-existing location methods. For example, other location methods can be based on acquisition using an environmental sensor system situated within the parking area. For example, an environmental sensor system can include video cameras based on which vehicles can be located within the parking area.

Further location methods are based for example on location systems situated within the vehicles. For example, video cameras are situated within the vehicles that acquire the respective surrounding environments of the vehicles, and thus enable a location of the vehicle within the parking area.

In particular, other location methods or techniques are based on a combination of the two location techniques named above, i.e. a combination of an external environmental sensor system (environmental sensor system within the parking area) and a vehicle-internal environmental sensor system (for example cameras inside the vehicles).

In particular, in this way the advantage is achieved that a robust location of vehicles can be brought about.

What is claimed is:

1. A method for locating a vehicle situated within a parking area using a plurality of WLAN base stations, each of the WLAN base stations including an antenna array, the vehicle including a communication interface for communication with the WLAN base stations via a wireless WLAN communication network, the method comprising:

receiving, by the respective antenna array, of a radio signal sent by the communication interface of the vehicle via the wireless communication network;

ascertaining a respective angle of incidence of the respective received radio signal relative to a respective normal of the antenna array;

ascertaining a signal intensity of the respective received radio signal; and carrying out a triangulation using the ascertained angles of incidence and the ascertained signal intensities to locate the vehicle within the parking area.

2. The method as recited in claim 1, further comprising:

checking, based on the location of the vehicle, whether an actual position of the vehicle corresponds to a predetermined target position within the parking area, such that, if the actual position is different from the target position, an ascertained route leading from the target position to a destination position situated within the parking area is adapted to the actual position of the vehicle, so that the vehicle is led in driverless fashion from the actual position to the destination position based on the adapted route.

3. The method as recited in claim 2, wherein the target position corresponds to a drop position within the parking area, at which a vehicle is to be dropped off in order to carry out an automatic parking process.

4. The method as recited in claim 2, wherein some of the plurality of WLAN base stations are situated within the parking area in such a way that a common radio signal receive region, formed from respective radio signal receive regions of the WLAN base stations, includes the target position and a predetermined region of from 5 m to 10 m around the target position.

5. The method as recited in claim 2, wherein some of the plurality of WLAN base stations are situated within the parking area in such a way that a common radio signal receive region, formed from the respective radio signal receive regions of the WLAN base stations, includes all travel paths provided for vehicles.

6. The method as recited in claim 2, wherein the vehicle is identified by an individual feature of the radio signal.

7. A system for locating a vehicle situated within a parking area, the vehicle including a communication interface for communication with WLAN base stations via a wireless WLAN communication network, the system comprising:

a plurality of WLAN base stations, each including an antenna array, for receiving, via the respective antenna array, a radio signal sent by the communication interface of the vehicle via the wireless WLAN communication network;

an ascertaining device to ascertain an angle of incidence of the respective received radio signal relative to a respective normal of the antenna array and to ascertain a signal intensity of the respective received radio signal; and a locating device to carry out a triangulation using the ascertained angles of incidence and the ascertained signal intensities in order to locate the vehicle within the parking area.

8. A parking area for vehicles, including a system for locating a vehicle situated within a parking area, the vehicle including a communication interface for communication with WLAN base stations via a wireless WLAN communication network, the system comprising:

a plurality of WLAN base stations, each including an antenna array, for receiving, via the respective antenna array, a radio signal sent by the communication interface of the vehicle via the wireless WLAN communication network;

an ascertaining device to ascertain an angle of incidence of the respective received radio signal relative to a respective normal of the antenna array and to ascertain a signal intensity of the respective received radio signal; and a locating device to carry out a triangulation using the ascertained angles of incidence and the ascertained signal intensities in order to locate the vehicle within the parking area.

9. A non-transitory computer-readable storage medium on which is stored a computer program including program code for locating a vehicle situated within a parking area using a plurality of WLAN base stations, each of the WLAN base stations including an antenna array, the vehicle including a communication interface for communication with the WLAN base stations via a wireless WLAN communication network, the computer program, when executed by a computer, causing the computer to perform:

receiving, by the respective antenna array, of a radio signal sent by the communication interface of the vehicle via the wireless communication network;

ascertaining a respective angle of incidence of the respective received radio signal relative to a respective normal of the antenna array;

ascertaining a signal intensity of the respective received radio signal; and carrying out a triangulation using the ascertained angles of incidence and the ascertained signal intensities to locate the vehicle within the parking area.

* * * * *